United States Patent Office 3,849,455
Patented Nov. 19, 1974

3,849,455
PROCESS FOR PREPARING METHYL AND ETHYL 3,11 - DIMETHYL - 7 - ETHYLTRIDECA-2,6,10-TRIENOATES
John A. Findlay, 682 George St., Fredericton, New Brunswick, Canada
No Drawing. Original application Dec. 30, 1969, Ser. No. 889,287, now abandoned. Divided and this application May 15, 1972, Ser. No. 253,085
Claims priority, application Canada, Jan. 6, 1969, 39,394
Int. Cl. C07c 67/00; C07d 1/22
U.S. Cl. 260—410.9 R         3 Claims

ABSTRACT OF THE DISCLOSURE

Process for preparing methyl and ethyl 10-epoxy-7-ethyl - 3,11 - dimethyl - 2,6 - tridecadienoate and intermediates used in their preparation, comprising condensing 3-methyl-1-penten-3-ol with ethyl vinyl ether to yield the corresponding α-ethoxyethyl ether; treating the latter with phosphoric acid to obtain 5-methyl-4-hepten-1-al, treating the latter with an ethyl magnesium halide to obtain 7-methyl-6-nonen-3-ol, and oxidizing the latter to 7-methyl-6-nonen-3-one; treating the latter with the ylid generated from 4-oxopentyl-1-triphenylphosphonium iodide ethylene ketal followed by removal of the ketal group to obtain 6-ethyl-10-methyldodeca-5,9-dien - 2 - one; treating the latter with the anion prepared from a dialkylcarbomethoxymethyl or a dialkylcarbethoxymethyl phosphonate to obtain methyl or ethyl 3,11-dimethyl-7-ethyltrideca-2,6,10-trienoate; and treating said compounds with a N-halosuccinimide followed by treatment with an alkali metal isopropoxide to obtain the corresponding methyl or ethyl 10-epoxy-7-ethyl-3,11-dimethyl-2,6-tridecadienoates.

The compounds have juvenile hormone activities and methods for their use are also disclosed.

---

This is a division of application Ser. No. 889,287 filed Dec. 30, 1969, now abandoned.

The present invention relates to a process for preparing methyl and ethyl 10-epoxy-7-ethyl-3,11-dimethyl-2,6-tridecadienoate and to intermediates used in their preparation. The methyl and ethyl 10-epoxy-7-ethyl-3,11-dimethyl-2,6-tridecadienoates of this invention may be represented by the formula I

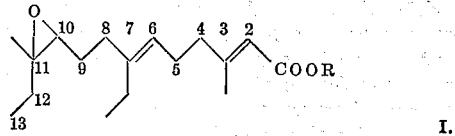

in which R represents methyl or ethyl.

The compound of formula I in which R represents the methyl group is capable of existence in several isomeric forms, one of which is identical with the juvenile hormone isolated from *Hyalophora cecropia* by Röller et al. (J. Insect Physiol. vol. 11, p. 1185 (1965), Life Sci., vol. 4, p. 1617 (1965), and Proceedings of the International Symposium on Insect Endocrinology, Brno, Czechoslovakia, 1966, Academic Press Inc., New York), the constitution of which was elucidated by Röller et al. (Angew. Chem. Intern. Ed. Engl., vol. 6, p. 179 (1967).)

The juvenile hormone isolated by Röller et al. cited above is particularly interesting because it seems to control egg ripening and the normal development of the sexually mature insect from the larva. In the normal life cycle of the insect, the juvenile hormone must be present at the stage of the immature larva if it is to progress through the normal stages of larval development. However, the juvenile hormone must be absent if the mature larva is to metamorphose into the sexually mature insect. Presence of the juvenile hormone at this point in the development of the insect will prevent the emergence of the sexually mature form capable of reproduction, and contact of the eggs with the juvenile hormone will prevent normal embryonic development. These facts are of great importance in the control of insect populations, and to date five different syntheses of the juvenile hormone have been reported (Dahm et al., J. Am. Chem. Soc., vol. 89, p. 5292 (1967); Dahm et al., Life Sci., vol. 7, p. 129 (1968); Corey et al., J. Am. Chem. Soc., vol. 90, p. 5618 (1968); Zurfluh et al., ibid, vol. 90, p. 6224 (1968); and Johnson et al., ibid, vol. 90, p. 6225 (1968)). It is the object of this invention to provide a simple and efficient process for the preparation of the juvenile hormone and of its ethyl analog.

The compounds of this invention of formula I exhibit the biological activities of the juvenile hormone and are useful as means for controlling insect populations. More particularly, these compounds, when tested in standard pharmacological tests used in entomology, for example in the modified *Tenebrio* test described by Röller et al. in Life Sci., vol. 4, p. 1617 (1965), exhibit the expected useful activity of the juvenile hormone. The compounds of this invention of formula IX also show the same type of biological activity, although to a considerably smaller extent. When administered to the test insects in the manner described by Röller et al. cited above the compounds of this invention of formulae I and IX cause the formation of typical pupal cuticle over the area of deposition.

For purposes of controlling insect populations, the compounds of this invention of formula I may be formulated in the form of liquid sprays, in solution in suitable solvents such as lipophilic solvents, for example vegetable or mineral oils, or hydrocarbon solvents, or solvents which have both lipophilic and hydrophilic characteristics, for example, lower aliphatic ketones or polyhydric alcohols; or they may be dissolved in a lipophilic solvent such as exemplified above and may be formulated in the form of aqueous emulsions together with suitable surface-active agents such as emulsifiers and/or detergents, and other suitable excipients. They may also be formulated in the form of dusting powders together with suitable solid excipients. Such preparations may contain from 0.1 to 100 mg. of the active ingredient per liter of liquid or per kilogram of solid preparation, and may be applied to areas or to the plants infested by the insects which are to be controlled, by means of spraying or dusting in the usual manner for controlling insect populations.

According to the process of this invention, the compounds of formula I may be prepared in the following manner: 3-Methyl-1-penten-3-ol (II), prepared from 2-butanone and sodium acetylide followed by partial reduction, is condensed with ethyl vinyl ether to yield the corresponding α-ethoxyethyl ether (III). The latter compound is heated with a catalytic amount of phosphoric acid to yield 5-methyl-4-hepten-1-al (IV), and said aldehyde is treated with an ethyl magnesium halide to give 7-methyl-6-nonen-3-ol (V), which is in turn oxidized to 7-methyl - 6 - nonen-3-one (VI). Treatment of the latter compound with the ylid generated from 4-oxopentyl-1-triphenylphosphonium iodide ethylene ketal (VII) by means of sodium methylsulfinyl carbanion prepared from sodium hydride and dimethylsulfoxide, yields, after removal of the protective ketal group, 6-ethyl-10-methyldodeca-5,9-dien-2-one (VIII). The intermediate 4-oxopentyl-1-triphenylphosphonium iodide ethylene ketal is prepared from 5-chloro-2-pentanone which is first converted to 5-iodo-2-pentanone; the latter compound is treated with ethylene glycol to obtain 5-iodo-2-pentanone ethylene ketal, and said last-named compound is treated with triphenylphosphine, to yield 4-oxopentyl-1-triphenylphosphonium iodide ethylene ketal.

6-Ethyl - 10 - methyldodeca - 5,9 - dien - 2 - one (VIII) obtained as above is treated with the anion prepared from a dialkylcarbomethoxymethyl or a dialkylcarbethoxymethyl phosphonate containnig from 1–4 carbon atoms in the alkyl groups. The latter compounds are conveniently prepared from methyl or ethyl chloroacetate and the appropriate trialkyl phosphite in which the alkyl group contains from 1–4 carbon atoms each, and the anion is prepared therefrom by means of an alkali metal alkoxide containing from 1–4 carbon atoms or an alkali metal hydride. There are thus obtained methyl or ethyl 3,11-dimethyl-7-ethyltrideca-2,6,10-trienoate (IX), and the latter compounds are converted to the corresponding 10-epoxy derivatives by treatment with a N-halosuccinimide followed by treatment with an alkali metal isopropoxide, to yield the corresponding methyl or ethyl 10-epoxy-7-ethyl-3,11-dimethyl-2,6-tridecadienoates (I).

It will be apparent to those skilled in the art that the compounds of this invention are capable of existing in many isomeric forms. This invention is not concerned with separating such isomers, although means for obtaining such separations will be equally apparent to those skilled in the art.

The principal advantage of the process of this invention is the fact that it proceeds from commercially available starting materials to the desired final products in good yields, and via a pathway involving relatively few steps, in contradistinction to the processes known from the literature. In view of the great importance of insect hormones, and expecially of the juvenile hormone, as means for controlling insect populations, a practically useful process of preparation as described more fully in the following sections is especially advantageous.

More specifically, in the process of my invention 3-methyl-1-penten-3-ol of formula II, prepared from 2-butanone and sodium acetylide in liquid ammonia, followed by reduction of the acetylenic alcohol 3-methyl-1-pentyn-3-ol thus obtained by means of hydrogen and Lindlar's catalyst, described in Helv. Chim. Acta, vol. 35, p. 446 (1952), is condensed with a molar excess of ethyl vinyl ether in the presence of phosphoric acid. Preferred reaction conditions include the use of 88% commercial phosphoric acid in catalytic amounts of approximately 1 part per 250 parts of the alcohol, a molar ratio of 3-methyl-1-penten-3-ol to ethyl vinyl ether of approximately 1:2, temperatures within the range of from 40° C. to the boiling point of the mixture, and times of reaction of from 2 to 24 hours.

In this manner there is obtained the α-ethoxyethyl ether of 3-methyl-1-penten-3-ol of formula III, which is purified by distillation.

The latter compound is heated in a closed vessel in the presence of catalytic amounts of phosphoric acid, to yield 5-methyl-4-hepten-1-al of formula IV. Preferred reaction conditions include the use of commercial 88% phosphoric acid in amounts of 1 part per 50 to 100 parts of the α-ethoxyethyl ether of 3-methyl-1-penten-3-ol, temperatures within the range of from 100–200° C., and reaction times of from 5–60 minutes. The compound is obtained in the residue after neutralization of the reaction mixture and removal of highly volatile constituents by distillation. It may be purified by distillation, but such purification is not necessary and the compound may be used as obtained from the reaction mixture.

5-Methyl-4-hepten-1-al obtained as described above is treated with a Grignard reagent prepared from an ethyl halide, preferably ethyl promide, and magnesium metal in diethyl ether, the resulting Grignard adduct is decomposed with ammonium chloride in the conventional manner, and the reaction mixture is extracted with ether. Washing with water, drying, and evaporating the solvent yields 7-methyl-6-nonen-3-ol of formula V, which may be used without further purification in the subsequent step.

Said last-named compound is treated with an oxidizing agent to yield 7-methyl-6-nonen-3-one of formula VI. Preferred reaction conditions include the use of 8 N chromic acid containing a trace of sulfuric acid in acetone solution (Jones' reagent), reaction temperatures of from 0–30° C., and reaction times of from 0.5–24 hours. The compound is isolated from the reaction mixture by dilution with water, extraction with ether, washing to neutrality, drying and evaporating the solvent. Purification is preferably obtained by chromotography, preferably on silica gel.

7-Methyl-6-nonen-3-one, obtained as described above, is treated with the ylid prepared from 4-oxopentyl-1-triphenylphosphonium iodide ethylene ketal of formula VII, obtained by treatment of the latter compound with an alkali metal alkoxide containing from 1 to 4 carbon atoms or an alkali metal hydride in a common solvent. 4-Oxopentyl - 1 - triphenylphosphonium iodide ethylene ketal of formula VII is prepared by treating commercially available 5-chloro-2-pentanone in a solvent with a molar excess of sodium iodide, to obtain the corresponding 5-iodo-2-pentanone. Preferred conditions for this reaction include the use of three equivalents of sodium iodide and of acetone as the solvent, and refluxing for 0.5 to 2 hours.

5-Iodo-2-pentanone thus obtained is ketalized by treatment in a water-immiscible solvent with a molar excess of ethylene glycol in the presence of small amounts of an acid catalyst, removing water from the reaction mixture as it is being formed. Preferred reaction conditions include the use of three equivalents of ethylene glycol, 0.1 equivalent of p-toluenesulfonic acid, benzene as the solvent, and a water separating device as part of the equipment. Refluxing the mixture for periods of time of from 8 to 24 hours yields 5-iodo-2-pentanone ethylene ketal.

Said last-named compound is treated with a molar excess of triphenylphosphine at a temperature within the range of from 50 to 150° C. in an inert solvent to yield 4-oxopentyl-1-triphenylphosphonium iodide ethylene ketal of formula VII. Preferred reaction conditions include the use of 1.1 equivalents of triphenylphosphine and of benzene as the solvent, and carrying out the reaction at the reflux temperature of the mixture, whereupon the desired compound crystallizes from the reaction mixture in a sufficiently pure state for immediate use.

In the above reaction it is preferred to prepare the ylid *in situ* in dimethylsulfoxide solution by first adding approximately one molar equivalent of sodium hydride to an excess of the solvent, dimethylsulfoxide, to form the sodium methylsulfinyl carbanion. Subsequent addition of a solution of 4-oxopentyl-1-triphenylphosphonium iodide ethylene ketal in dimethylsulfoxide, under nitrogen at a temperature within the range of from 15–35° C., and stirring for a period of time of from 5–30 minutes yields the desired ylid. To this solution of the ylid thus obtained there are added 0.5–1.0 molar equivalents, preferably 0.6 molar equivalents, of 7-methyl-6-nonen-3-one, and the mixture is stirred at temperatures of from 20° C. to the boiling point of the mixture for periods of time of from 3–24 hours. Dilution with water, extraction with a water-immiscible solvent, preferably n-pentane, and evaporation of the solvent yields a residue which is identified as 6-ethyl-10-methyldodeca-5,9-dien-2-one ethylene ketal. The latter compound is preferably not isolated, but the residue obtained as described above is treated in an inert water-immiscible solvent, preferably tetrahydrofuran, with an acid, preferably dilute aqueous hydrochloric acid. In this manner the ketal group is removed and there is obtained 6-ethyl-10-methyldodeca-5,9-dien-2-one of formula VIII.

Said latter compound is treated with the anion prepared from a dialkylcarbomethoxymethyl or a dialkylcarbethoxymethyl phosphonate, preferably diethylcarbomethoxymethyl phosphonate, obtained from methyl chloroacetate and triethyl phosphite according to the method described by P. C. Crofts in Quart. Rev. Chem. Soc., 12, 341 (1958) by the action of approximately an equivalent amount of an alkali metal hydride in an inert solvent or by the action of an approximately equivalent amount of an appropriate alkali metal alkoxide containing from 1 to 4 carbon atoms in an inert solvent. This anion formation is performed preferably by mixing equivalent molar amounts of the appropriate dialkylcarbomethoxymethyl or dialkylcarbethoxymethyl phosphonate, preferably diethylcarbomethoxymethyl phosphonate, with sodium hydride in benzene, stirring the reaction mixture at a temperature of from 10–50° C. until the sodium hydride dissolves in the reaction mixture. The alkyl groups in the above compounds contain from 1 to 4 carbon atoms.

Addition of said latter compound, 6-ethyl-10-methyl-dodeca-5,9-dien-2-one described above, to the prepared solution of the above anion yields the corresponding methyl or ethyl 3,11-dimethyl-7-ethyl trideca-2,6,10-trienoate of formula IX. Thus, when using the anion prepared from diethylcarbomethoxymethyl phosphonate, methyl 3,11-dimethyl-7-ethyltrideca-2,6,10-trienoate of formula IX is obtained, and when using the anion prepared from diethylcarbethoxymethyl phosphonate, ethyl 3,11-dimethyl-7-ethyltrideca-2,6,10-trienoate is obtained. Preferred conditions in the above reaction include agitating the reaction mixture at temperatures of from 10–50° C. for periods of time of from 8 hours to 6 days, dilution with water, extraction with a water-immiscible solvent, and purification by chromatography, preferably on silica gel.

The methyl or ethyl 3,11-dimethyl-7-ethyltrideca-2,6,10-trienoate of formula IX thus obtained may be converted to each other, if desired. Thus, methyl 3,11-dimethyl-7-ethyltrideca-2,6,10-trienoate is hydrolyzed with a molar excess of an alkali metal hydroxide, preferably 5% potassium hydroxide in methanol, to yield 3,11-dimethyl-7-ethyltrideca-2,6,10-trienoic acid, and the latter compound is treated with diazoethane, to yield ethyl 3,11-dimethyl-7-ethyltrideca-2,6,10-trienoate. The same procedure may also be used to purify a given ester of formula IX. Thus, when starting with impure methyl 3,11-dimethyl-7-ethyl-trideca-2,6,10-trienoate, hydrolyzing as described above, and treating the trienoic acid thus obtained with diazomethane, a pure sample of the methyl ester of formula IX is obtained.

The final conversion of methyl or ethyl 3,11-dimethyl-7-ethyltrideca-2,6,10-trienoates to the desired methyl or ethyl 10-epoxy-7-ethyl-3,11-dimethyl-2,6-tridecatrienoates of formula I is carried out by treatment of the former compounds with a molar excess of an N-halosuccinimide in solution in a mixture of 1.5 to 4 parts of dimethoxyethane and 1 part of water, followed by treatment of the reaction product with a molar excess of an alkali metal isopropoxide, all reactions being carried out at temperatures of from −10° C. to 10° C., for 20 to 120 minutes, in a manner similar to that described by Corey et al. cited above. Preferred reaction conditions include the use of 1.1 equivalents of N-bromosuccinimide, of a 3:1 mixture of dimethoxyethane and water as solvent, of 1.2 equivalents of sodium isopropoxide, of reaction temperatures close to 0° C., and of reaction times of 60 minutes. The desired methyl or ethyl 10-epoxy-7-ethyl-3,11-dimethyl-2,6-tridecadienoates thus obtained may be purified, preferably by chromatography on silica gel or on alumina.

The following formulae, in which R represents methyl or ethyl, and Examples are illustrative of this invention.

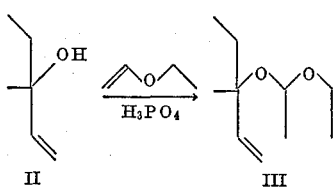

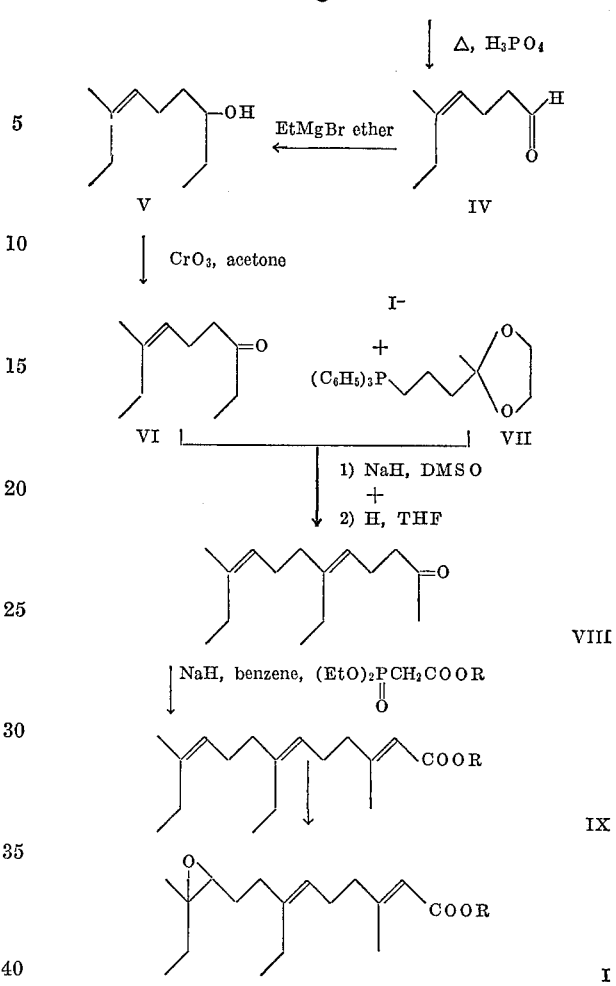

EXAMPLE 1

(A) 3-Methyl-1-pentyne-3-ol

Sodium (27.6 g.) in 2000 ml. liquid ammonia is treated with acetylene gas until the solution is saturated. 2-Butanone (72.1 g.) in 300 ml. ether is added, the mixture is stirred for 8 hours at −40° C. to −35° C., the ammonia is allowed to evaporate, the residue is diluted with water, extracted with ether, the ether is washed, dried and evaporated, and the residue is distilled, to yield the title compound with b.p. 121° C.;

$\gamma_{max.}^{CHCl_3}$ 3600, 3310, 2970, 2930, 2875 cm.$^{-1}$ $\tau$ COCl$_3$ 7.55, 8.35, 8.51, 8.96.

(B) 3-Methyl-1-penten-3-ol (II)

To a solution of 3-methyl-1-pentyn-3-ol, (9.8 g.) obtained as described above, in an equal volume of petroleum ether, 0.42 g. of quinoline and 0.75 g. of Lindlar catalyst are added. The mixture is shaken in a hydrogen atmosphere at atmospheric pressure for 18 hours, when one mole of hydrogen is taken up. The mixture is filtered, the solvent is evaporated and the residue is distilled to yield the title compound with b.p. 116° C.;

$\gamma_{max.}^{CHCl_3}$ 3600, 2970, 2925, 2875, 1675 cm.$^{-1}$; $\tau^{CDCl_3}$ 4.38, 4.75, 4.91, 8.73, 9.13.

(C) α-Ethoxyethyl ether of 3-Methyl-1-penten-3-ol (III)

To a mixture of 25 g. (0.25 moles) of 3-methyl-1-penten-3-ol and 38 g. (0.53 moles) of ethyl vinyl ether there is added 0.1 g. orthophosphoric acid. The mixture is refluxed for 19 hours, neutralized with 0.25 ml. of triethylamine and distilled under reduced pressure, to yield the title compound with b.p. 70.5° C./23 mm. Hg;

$\gamma_{max.}^{CHCl_3}$ 2975, 2925, 2875, 1640, 1140, 1105, 1075, 1040 cm.$^{-1}$, $\tau^{CDCl_3}$ 4.75, 6.49, 8.69, 9.16. In one experiment carried out according to the above procedure the yield was 91.2 percent of theory.

EXAMPLE 2

5-Methyl-4-hepten-1-al (IV)

The α-ethoxyethyl ether of 3-methyl-1-penten-3-ol (13.1 g., 0.076 mole), and obtained as described in Example 1, one drop of 88% orthophosphoric acid are heated to 150° C. for one-half hour in a sealed glass tube. The mixture is neutralized with 3 drops of triethylamine and evaporated under reduced pressure at room temperature, to yield the title compound as a light yellow, clear, liquid with b.p. 60–62° C./14 mm. Hg, $\gamma_{max.}^{CHCl_3}$ 2960, 2925, 2870, 2720, 1720, 1680 cm.$^{-1}$, $\tau^{CDCl_3}$ 0.29, 4.98, 8.41, also characterized by vapour phase chromatography. In one experiment carried out according to the above procedure the yield was 54.5 percent of theory.

EXAMPLE 3

7-Methyl-6-nonen-3-ol (V)

5-Methyl-4-hepten-1-al (8.13 g., 0.0644 mole), obtained as described in Example 2, is dissolved in 3 volumes of dry ether and added dropwise, with cooling in an ice bath, to a Grignard reagent prepared from magnesium (1.72 g., 0.0708 mole) and ethyl bromide (8.6 g., 0.0779 mole). The mixture is refluxed for one hour and decanted into an ice-cold solution of 5.7 g. ammonium chloride in 150 ml. water. The ether layer is separated and the aqueous phase is extracted twice with ether. The combined ethereal phases are washed to neutrality, dried over anhydrous sodium sulfate, and evaporated, to yield the title compound as a light yellow liquid, b.p. 206° C.;

$\gamma_{max.}^{CHCl_3}$ 3620, 2970, 2940, 2875, 1660 cm.$^{-1}$; $\tau^{CDCl_3}$ 4.90, 6.50, 8.35, 9.04; m/e 156, 138. In one experiment carried out according to the above procedure the yield was 95 percent of theory.

EXAMPLE 4

7-Methyl-6-nonen-3-one (VI)

7-Methyl-6-nonen-3-ol (1.0 g., 0.0064 mole) obtained as described in Example 3, is dissolved in two volumes of acetone, and cooled in an ice bath. Jones' reagent is added dropwise until an orange colour persists, the mixture is stirred in an ice bath for one half-hour, diluted with an equal volume of water, extracted four times with ether, the ether extracts washed with 5% sodium bicarbonate solution, dried over anhydrous magnesium sulfate, filtered, and evaporated, to give a clear, light yellow liquid, which is subjected to chromatography over 75 g. silica gel, eluting with ether:petroleum ether (15:85), yielding the title compound as a colourless liquid, $\gamma_{max.}^{CHCl_3}$ 2965, 2925, 2870, 1710 cm.$^{-1}$; $\tau^{CDCl_3}$ 5.05, 7.64, 8.39, 9.04; m/e 154. The compound is also characterized as the 2,4-dinitrophenylhydrazone with m.p. 48–49° C.

In one experiment carried out according to the above procedure the yield was 79 percent of theory.

EXAMPLE 5

4-Oxopentyl-1-triphenylphosphonium iodide ethylene ketal (VII)

(A) 5-Iodo-2-pentanone

Commercial 5-chloro-2-pentanone (4.82 g., 0.04 mole) and sodium iodide (18.0 g., 0.12 mole) are dissolved in 100 ml. acetone and refluxed for one hour. The acetone is evaporated, the residue dissolved in water and extracted twice with ether. The combined ether phases are washed with 0.1 N sodium thiosulfate to remove free iodine, dried over anhydrous magnesium sulfate, filtered, and evaporated, to yield the title compound as a light yellow liquid, $\gamma_{max.}^{CHCl_3}$ 2955, 1710 cm.$^{-1}$; $\tau^{CDCl_3}$ 6.81, 7.44, 7.87, 800. A sample is purified by distillation to b.p. 94° C./14 mm. Hg, but partial decomposition occurs during distillation and the bulk of the material is used without purification in the subsequent step.

In one such experiment the yield obtained was 58 percent of theory.

(B) 5-Iodo-2-pentanone ethylene ketal

5-Iodo-2-pentanone (68 g., 0.32 mole), obtained as described above, p-toluenesulfonic acid (6.1 g., 0.032 mole), and ethylene glycol (51.8 g., 0.96 mole) are refluxed together with 800 ml. benzene in an apparatus equipped with a water separator for one day. The reaction mixture is cooled, diluted with 1250 ml. 5% sodium bicarbonate solution, and extracted twice with 625 ml. portions of ether. The combined ether extracts are washed with 400 ml. 0.1 N sodium thiosulfate to remove excess iodine, dried over sodium sulfate, filtered, evaporated, and the residue is distilled under reduced pressure, to yield the title compound with b.p. 76° C./0.05 mm. Hg.

$\gamma_{max.}^{CHCl_3}$ 2955, 1375, 1115 cm.$^{-1}$, $\tau^{CDCl_3}$ 6.06, 6.75, 8.21, 8.69.

In one such experiment the yield was 100 percent of theory.

(C) 4-Oxopentyl-1-triphenylphosphonium iodide ethylene ketal

Triphenylphosphine (11.2 g., 0.0429 mole) is dissolved in 35 ml. benzene and 10 ml. benzene are distilled off to remove traces of water. 5-Iodo-2-pentanone ethylene ketal (10.0 g., 0.039 mole), obtained as described above, is added and the mixture is refluxed for one hour. The title compound crystallizes from the reaction mixture, is filtered off and washed with dry ether, m.p. 210–215° C., $\gamma_{max.}^{CHCl_3}$ 1435, 1110 cm.$^{-1}$.

In one such experiment the yield obtained was 74 percent of theory.

EXAMPLE 6

6-ethyl-10-methyldodeca-5,9-dien-2-one (VIII)

Sodium hydride (202 mg., 4.83 millimole, 56.8% suspension in mineral oil) is stirred with 4 ml. dimethylsulfoxide at 75–80° C. for 45 minutes under nitrogen. Hydrogen is evolved during that period. The mixture is cooled to room temperature, and 4-oxopentyl-1-triphenylphosphonium iodide ethylene ketal (2.76 g., 5.32 millimole), obtained as described in Example 5, in 8 ml. dimethylsulfoxide is added. The mixture is stirred at room temperature under nitrogen for 15 minutes. 7-Methyl-6-nonen-3-one (500 mg., 3.22 millimole), obtained as described in Example 4, in 1.5 ml. dimethyl sulfoxide is added, and the mixture is stirred at room temperature under nitrogen for six hours and then overnight at 80° C. The reaction mixture is diluted with 80 ml. water, extracted with four portions of approximately one-half volume each of n-pentane, the n-pentane extracts are washed with water, dried with anhydrous magnesium sulfate, filtered, and the n-pentane is evaporated to yield 6-ethyl-10-methyldodeca-5,9-dien-2-one ethylene ketal $\gamma_{max.}^{CHCl_3}$ 1650, 1450, 1375, 945 cm.$^{-1}$; $\tau^{CDCl_3}$ 4.90, 6.06, 8.39, 8.67, 9.02. Said last-named compound is dissolved in 10 ml. tetrahydrofuran, 10 ml. 3% aqueous hydrochloric acid are added, the mixture is stirred overnight at room temperature, the tetrahydrofuran is evaporated under reduced pressure, and the mixture is extracted with three equal volumes of ether. The combined ether extracts are washed with water to neutrality, dried over anhydrous magnesium sulfate, filtered, and evaporated. The residue is chromatographed on a column of 35 g. silica gel, eluting with ether:petroleum ether (1:9) to yield the title compound as a light yellow liquid, $\gamma_{max.}^{CHCl_3}$ 2930, 1710, 1660 cm.$^{-1}$, $\tau^{CDCl_3}$ 5.02, 7.65, 7.89, 8.36, 9.05, m/e 222.

In one experiment carried out according to the above procedure the yield was 84 percent of theory.

EXAMPLE 7

Methyl-3,11-dimethyl-7-ethyltrideca-2,6,10-trienoate (IX)

A. Diethylcarbomethoxymethyl phosphonate

Following the general procedure described by P. C. Crofts in Quart. Rev. Chem. Soc., vol. 12, p. 341 (1958), methyl chloroacetate (1.9 g., 0.11 m.) and triethyl phosphite (16.6 g, 0.10 m.) are heated together at 160° C. bath temperature overnight, and the reaction mixture is distilled under reduced pressure to yield the title compound with b.p. 90° C./0.2 mm. Hg, $\gamma_{max.}^{CHCl_3}$ 2980, 1735 cm.$^{-1}$, $\tau^{CDCl_3}$ 5.85, 6.28, 7.06, 8.65. In one experiment carried out according to the above procedure the yield was 94.7 percent of theory.

In the same manner, but using ethyl chloroacetate as starting material, diethylcarbethoxymethyl phosphonate is obtained.

(B) Methyl 3,11-dimethyl-7-ethyltrideca-2,6,10-trienoate

Sodium hydride (15 mg., 0.357 millimole, 56.8% suspension) is suspended in 1 ml. of dry benzene, diethylcarbomethoxymethyl phosphonate (75 mg., 0.357 millimole), obtained as described above, is added dropwise and the mixture is stirred at room temperature until clear. 6-Ethyl-10-methyldodeca-5,9-dien-2- one (53 mg., 0.238 millimole), obtained as described in Example 6, is added and the mixture is stirred at room temperature for 4 days. Dilution with an equal volume of water, extraction with ether, washing the ether extracts to neutrality, drying over anhydrous magnesium sulfate, and evaporation of the ether yields an oily residue which is purified by chromatography on a column of 20 g. silica gel. Elution with ether:petroleum ether (1:9) yields the title compound as a colourless oil, $\gamma_{max.}^{CHCl_3}$ 2915, 1720, 1645 cm.$^{-1}$; $\tau^{CDCl_3}$ 4.35, 4.97, 6.32, 7.81, 8.32, 9.04; m/e 278.

In one experiment carried out according to the procedure given above the yield was 85.5 percent of theory.

The above title compound may also be purified by hydrolysis followed by reesterification, as follows: The crude compound (100 mg.) is dissolved in 5% potassium hydroxide in methanol (10 ml.), the mixture is refluxed overnight, evaporated under reduced pressures, 1% aqueous hydrochloric acid is added until the mixture is slightly acidic and the mixture is extracted with ether. The ether extracts are washed to neutrality, dried over anhydrous magnesium sulfate, filtered, and evaporated. The residue of 3,11-dimethyl-7-ethyl-2,6,10-tridecatrien-oic acid is dissolved in a 1:1 mixture of ether and methanol (5 ml.) and diazomethane is added until a yellow colour persists. The mixture is evaporated under reduced pressure and the residue is subjected to chromatography on silica gel as described above to yield the pure title compound with the same physical constants as given above.

In the same manner as described in the first part of this Example, by using diethylcarbethoxymethyl instead of diethylcarbomethoxymethyl phosphate as starting material, ethyl 3,11-dimethyl-7-ethyltrideca-2,6-trienoate is obtained. The same compounds is also obtained by treating a sample of methyl 3,11-dimethyl-7-ethyltrideca-2,6,10-trienoate (29 mg., 0.1 millimole) with 0.2 ml. of 1 N methanolic sodium hydroxide at room temperature for two hours, neutralizing the mixture, extracting with ether, washing to neutrality, drying over anhydrous magnesium sulfate, and evaporating the ether to obtain 3,11-dimethyl-7-ethyl-2,6,10-tridecatrien-oic acid, and treating the latter compound with diazoethane.

EXAMPLE 8

Methyl 10-epoxy-7-ethyl-3,11-dimethyl-2,6-tridecadienoate (I)

Methyl 3,11-dimethyl - 7 - ethyltrideca-2,6,10-trienoate (40 mg., 0.144 millimole), obtained as described in Example 7, is dissolved in 2 ml. of a 3:1 mixture of 1,2-dimethoxyethane and water, cooled to 0° C. and N-bromosuccinimide (28 mg., 0.158 millimole) is added. The mixture is stirred at 0° C. for one hour, the solvent is evaporated under reduced pressure, the residue is dissolved in n-pentane, dried with anhydrous magnesium sulfate, filtered and the solvent is evaporated. The residue is treated with a solution of sodium metal (4 mg.) in 2 ml. anhydrous isopropanol at 0° C., and stirred at 0° C. for one-half hour. The solvent is evaporated under reduced pressure. The residue is dissolved in anhydrous ether, filtered from sodium bromide, and evaporated. The pale yellow oily residue is purified by chromatography on alumina plates, developing with ether:petroleum ether (2:3), to yield the title compound as a clear colourless oil, $\gamma_{max.}^{CHCl_3}$ 2950, 1710, 1645 cm.$^{-1}$, $\tau^{CDCl_3}$ 4.38, 4.86, 6.35, 7.47, 7.82, m./e. 294. In one experiment carried out according to the above procedure the yield was 51 percent of theory.

In the same manner, by using 3,11-dimethyl-7-ethyltrideca-2,6,10-trienoate as the starting material, the corresponding ethyl 10-epoxy-7-ethyl-3,11-dimethyl-2,6-tridecadienoate is also obtained.

The embodiments of the invention in which an inclusive property or privilege is claimed are defined as follows:

1. A process for preparing an isomeric mixture of methyl or ethyl 3,11-dimethyl-7-ethyl-trideca-2,6,10-trienoates which comprises treating 3-methyl-1-penten-3-ol with ethyl vinyl ether in the presence of orthophosphoric acid to yield the α-ethoxyethyl ether of 3-methyl-1-penten-3-ol; heating said last-named compound in the presence of orthophosphoric acid to obtain 5-methyl-4-hepten-1-al; treating said last-named compound with ethyl magnesium bromide and decomposing the reaction mixture to obtain 7-methyl-6-nonen-3-ol; treating said last-named compound with Jones' reagent to obtain 7-methyl-6-nonen-3-one; treating said last-named compound with the ylid prepared from 4-oxopentyl-1-triphenyl-phosphonium iodide ethylene ketal to obtain 6-ethyl-10-methyldodeca-5,9-dien-2-one ethylene ketal; treating said latter compound with hydrochloric acid to obtain 6-ethyl-10-methyl-dodeca-5,9-dien-2-one; and treating said later compound with the anion prepared from diethylcarbomethoxymethyl or diethylcarbethoxymethyl phosphonate in benzene to obtain, respectively, methyl or ethyl 3,11-dimethyl-7-ethyltrideca-2,6,10-trienoate.

2. A process for preparing an isomeric mixture of methyl or ethyl 3,11-dimethyl-7-ethyltrideca-2,6,10-trienoates which comprises treating 3-methyl-1-penten-3-ol with a molar excess of ethyl vinyl ether in the presence of a catalytic amount of orthophosphoric acid at a temperature from 40° C. to the boiling point of the mixture for from two to 24 hours to obtain the α-ethoxyethyl ether of 3-methyl-1-penten-3-ol; heating said last-named compound in the presence of $\frac{1}{100}$ to $\frac{1}{50}$ part by weight of orthophosphoric acid at from 100 to 200° C. under autogenous pressure for from five to 60 minutes to obtain 5-methyl-4-hepten-1-al; treating said last compound with the Grignard reagent prepared from ethyl bromide and magnesium metal and decomposing the resulting Grignard adduct to obtain 7-methyl-6-nonen-3-ol; treating said last-named compound with Jones' reagent at from 0 to 30° C. for from 0.5 to 24 hours to obtain 7-methyl-6-nonen-3-one; treating 0.6 molar equivalent of the ylid prepared from 4-oxopentyl-1-triphenyl-phosphonium iodide ethylene ketal, at a temperature of from 20 to 80° C. for from three to 24 hours to obtain 6-ethyl-10-methyldodeca-5,9-dien-2-one ethylene ketal; treating said last-named compound with aqueous hydrochloric acid in tetrahydrofuran solution to obtain 6-ethyl-10-methyldodeca-5,9-dien-2-one; and treating said last compound with the anion prepared from diethylcarbomethoxymethyl phosphonate or diethylcarbethoxymethyl phosphonate in the presence of sodium hydride in benzene solution at a temperature of from 10 to 50° C. for from 8 hours to six days to obtain, respectively, methyl or ethyl 3,11-dimethyl-7-ethyltrideca-2,6,10-trienoate.

3. A process for preparing an isomeric mixture of 6-ethyl-10-methyl-dodeca - 5,9 - dien-2-one useful in the preparation of methyl or ethyl 10-epoxy-7-ethyl-3,11-dimethyl-2,6-tridecadienoates of high juvenile hormone activity which comprises treating 3-methyl-1-penten-3-ol with a molar excess of ethyl vinyl ether in the presence of a catalytic amount of orthophosphoric acid at a temperature from 40° C. to the boiling point of the mixture for from two to 24 hours to obtain the α-ethoxyethyl ether of 3-methyl-1-penten-3-ol; heating said last-named compound in the presence of $\frac{1}{100}$ to $\frac{1}{50}$ part by weight of orthophosphoric acid at from 100 to 200° C. under autogenous pressure for from five to 60 minutes to obtain 5-methyl-4-hepten-1-al; treating said last compound with the Grignard reagent prepared from ethyl bromide and magnesium metal and decomposing the resulting Grignard adduct to obtain 7-methyl-6-nonen-3-ol; treating said last-named compound with Jones' reagent at from 0 to 30° C. for from 0.5 to 24 hours to obtain 7-methyl-6-nonen-3-one; treating 0.6 molar equivalents of said last compound with approximately a molar equivalent of the ylid prepared from 4-oxopentyl-1-triphenyl-phosphonium iodide ethylene ketal, at a temperature of from 20 to 80° C. for from three to 24 hours to obtain 6-ethyl-10-methyldodeca-5,9-dien-2-one ethylene ketal; and treating said last-named compound with aqueous hydrochloric acid in tetrahydrofuran solution to obtain 6-ethyl-10-methyldodeca-5,9-dien-2-one.

References Cited

UNITED STATES PATENTS

| 3,671,558 | 6/1972 | Siddall et al. | 260—410.9 R |
| 3,453,317 | 7/1969 | Marbet et al. | 260—476 |
| 2,363,092 | 11/1944 | Smith et al. | 260—593 |
| 2,809,216 | 10/1957 | Inhoffen et al. | 260—601 |

FOREIGN PATENTS

| 67/5149 | 1/1968 | South Africa. |

OTHER REFERENCES

Findlay et al.: Chemical Communications, No. 13, pp. 733–734, July 1969.

LEWIS GOTTS, Primary Examiner

D. G. RIVERS, Assistant Examiner

U.S. Cl. X. R.

260—340.9, 348 A, 593 R, 601 R, 615 A, 638 R; 424—278, Dig. 12